(12) United States Patent
Little

(10) Patent No.: US 10,474,493 B2
(45) Date of Patent: Nov. 12, 2019

(54) SYSTEMS AND METHODS FOR SEMI-DURABLE TRANSACTION LOG STORAGE IN TWO-PHASE COMMIT PROTOCOL TRANSACTION PROCESSING

(71) Applicant: Red Hat, Inc., Raleigh, NC (US)

(72) Inventor: Mark Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 522 days.

(21) Appl. No.: 14/193,645

(22) Filed: Feb. 28, 2014

(65) Prior Publication Data

US 2015/0248308 A1  Sep. 3, 2015

(51) Int. Cl.
*G06F 9/46* (2006.01)
*G06F 16/23* (2019.01)

(52) U.S. Cl.
CPC .......... *G06F 9/466* (2013.01); *G06F 16/2358* (2019.01); *G06F 16/2365* (2019.01)

(58) Field of Classification Search
CPC ............... G06F 17/30008; G06F 9/466; G06F 17/30286; G06F 17/30575; G06F 17/30377; G06F 17/30371
USPC ......................................................... 707/703
See application file for complete search history.

(56) References Cited

U.S. PATENT DOCUMENTS 5,799,305 A * 8/1998 Bortvedt ................. G06F 9/466
707/E17.007
6,052,695 A * 4/2000 Abe ..................... G06F 11/1471
707/999.201
6,510,421 B1 * 1/2003 Ganesh ............... G06F 16/2343
707/999.008

(Continued)

FOREIGN PATENT DOCUMENTS

WO  WO 2013/112634  8/2013

OTHER PUBLICATIONS

Volos et al., "Mnemosyne: Lightweight Persistent Memory", http://pages.cs.wisc.edu/~swift/papers/asplos11_mnemosyne.pdf, ASPLOS, Mar. 5-11, 2011, 13 pages, Computer Sciences Department, University of Wisconsin-Madison; Skype Limited, Newport Beach, CA.

(Continued)

*Primary Examiner* — Pierre M Vital
*Assistant Examiner* — Andrew N Ho
(74) *Attorney, Agent, or Firm* — Haynes and Boone, LLP

(57) ABSTRACT

Systems and methods are provided for semi-durable transaction log storage in a two-phase commit protocol transaction processing. An exemplary method includes receiving a distributed transaction comprising a plurality of processes for processing, wherein the processing uses a two-phase commit protocol and preparing, by a main coordinator, at least one participant comprising at least one of the plurality of processes to prepare for execution by the at least one participant. The method further includes receiving, by the main coordinator, information comprising prepared processes of the at least one of the plurality of processes and storing, by the main coordinator, a transaction log comprising the at least one participant and the information to a semi-durable storage. The semi-durable storage may comprise a crash-proof storage that survives system failure. Thus, the semi-durable storage may write the transaction log to the durable storage if there is a system failure.

18 Claims, 4 Drawing Sheets

(56) References Cited

U.S. PATENT DOCUMENTS

| | | | |
|---|---|---|---|
| 6,513,093 B1 | 1/2003 | Chen et al. | |
| 7,168,612 B2 | 1/2007 | Montgomery et al. | |
| 7,249,150 B1 | 7/2007 | Watanabe et al. | |
| 8,412,689 B2 | 4/2013 | Reid et al. | |
| 2002/0083078 A1* | 6/2002 | Pardon | G06F 9/466 707/104.1 |
| 2003/0046298 A1* | 3/2003 | Weedon | G06F 9/466 707/102 |
| 2004/0215640 A1* | 10/2004 | Bamford | G06F 17/30575 707/100 |
| 2006/0095438 A1* | 5/2006 | Fachan | G06F 17/30227 707/10 |
| 2007/0220059 A1* | 9/2007 | Lu | G06F 16/2358 707/999.2 |
| 2008/0040729 A1* | 2/2008 | Garza | G06F 9/546 719/318 |
| 2008/0250074 A1* | 10/2008 | Parkinson | G06F 11/1474 707/200 |
| 2009/0300074 A1* | 12/2009 | Little | G06F 17/30377 707/202 |
| 2012/0030184 A1* | 2/2012 | Driesen | G06F 17/30377 707/703 |
| 2013/0060742 A1* | 3/2013 | Chang | G06F 16/2322 707/704 |
| 2013/0318060 A1 | 11/2013 | Chang et al. | |

OTHER PUBLICATIONS

Stamos et al., "Coordinator Log Transaction Execution Protocol", http://link.sprincier.com/article/10.1007/BF01264014#, IBM Research Division, Apr. 9, 1993, pp. 1-41, Almaden Research Center, San Jose, CA.

Shu et al., "Achieving Bounded and Predictable Recovery Using Real-Time Logging", http://citeseerx.ist.psu.edu/viewdoc/download?doi.10.1.1.60.2772&rep=rep1&type=pdf, The Computer Journal, 2004, pp. 1-22, vol. 47, No. 4, Department of Accounting, National Cheng Kung University, Tainan City; Department of Computer Science, University of Virginia.

Pelley et al., "Storage Management in the NVRAM Era" http://www.vldb.org/pvldb/vol7/p121-pellev.pdf, Proceeding of the VLDB Endowment, 2003, pp. 121-132, vol. 7, No. 2.

* cited by examiner

SYSTEMS AND METHODS FOR SEMI-DURABLE TRANSACTION LOG STORAGE IN TWO-PHASE COMMIT PROTOCOL TRANSACTION PROCESSING

FIELD OF DISCLOSURE

The present disclosure generally relates to a two-phase commit protocol transaction processing, and more particularly to semi-durably storing a transaction log in two-phase commit protocol transaction processing to survive system failure but improve write speed over durable storage options.

BACKGROUND

A distributed transaction may include a set of processes or operations that may involve the use of more than one network host/resource. For example, a distributed transaction may call for database updates or operations using more than one database. A network host may provide for transaction resources utilized by a process, such as the database that requires updating and/or use. A transaction manager may receive a distributed transaction and prepare participating processes to execute on required network hosts. Thus, the transaction manager may prepare a coordinator network host/node that manages a set of participating network nodes each executing one or more processes of the distributed transaction.

Similar to other transactions, distributed transaction must maintain atomicity, consistency, isolation, and durability properties (ACID properties). Atomicity requires that changes made during processing a transaction are atomic, either all the changes to a database during an operation or update occur or they all do not occur. This prevents database updates from partially occurring, which would affect the reliability and consistency of databases. Additionally, durability requires that changes made as a result of processing a distributed transaction survive a system failure; that is results of a committed distributed transaction are durably recorded. In order to prevent violation of atomicity and durability, a transaction log is utilized to assist the transaction processing system with rollback for inconsistent states, to commit processes executed on a participating network host, and/or during recovery after a crash. However, performance for processing a distributed transaction is affected by the write speeds of a transaction log to a durable storage that can survive system (e.g., power) failure.

BRIEF SUMMARY

This disclosure relates to distributed transaction processing systems and two-phase commit protocol transaction processing. Methods, systems, and techniques for semi-durable transaction log storage in two-phase commit protocol transaction processing are provided According to an embodiment, a system for distributed transaction processing includes a main coordinator that receives a distributed transaction comprising a plurality of processes for processing, wherein the processing uses a two-phase commit protocol and at least one participant coupled to the transaction manager that prepares at least one of the plurality of processes for execution and transmits information comprising prepared processes of the at least one of the plurality of processes to the main coordinator. The system further includes a semi-durable storage that stores a transaction log comprising the at least one participant and the information.

According to another embodiment, a method for distributed transaction processing includes receiving a distributed transaction comprising a plurality of processes for processing, wherein the processing uses a two-phase commit protocol and preparing, by a main coordinator, at least one participant comprising at least one of the plurality of processes to prepare for execution by the at least one participant. The method further includes receiving, by the main coordinator, information comprising prepared processes of the at least one of the plurality of processes and storing, using one or more hardware processors of the main coordinator, a transaction log comprising the at least one participant and the information to a semi-durable storage.

A non-transitory computer readable medium comprising a plurality of machine-readable instructions which when executed by one or more processors of a server are adapted to cause the server to perform a method including receiving a distributed transaction comprising a plurality of processes for processing, wherein the processing uses a two-phase commit protocol and preparing, by a main coordinator, at least one participant comprising at least one of the plurality of processes to prepare for execution by the at least one participant. The method further includes receiving, by the main coordinator, information comprising prepared processes of the at least one of the plurality of processes and storing, by the main coordinator, a transaction log comprising the at least one participant and the information to a semi-durable storage.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Figure 1:
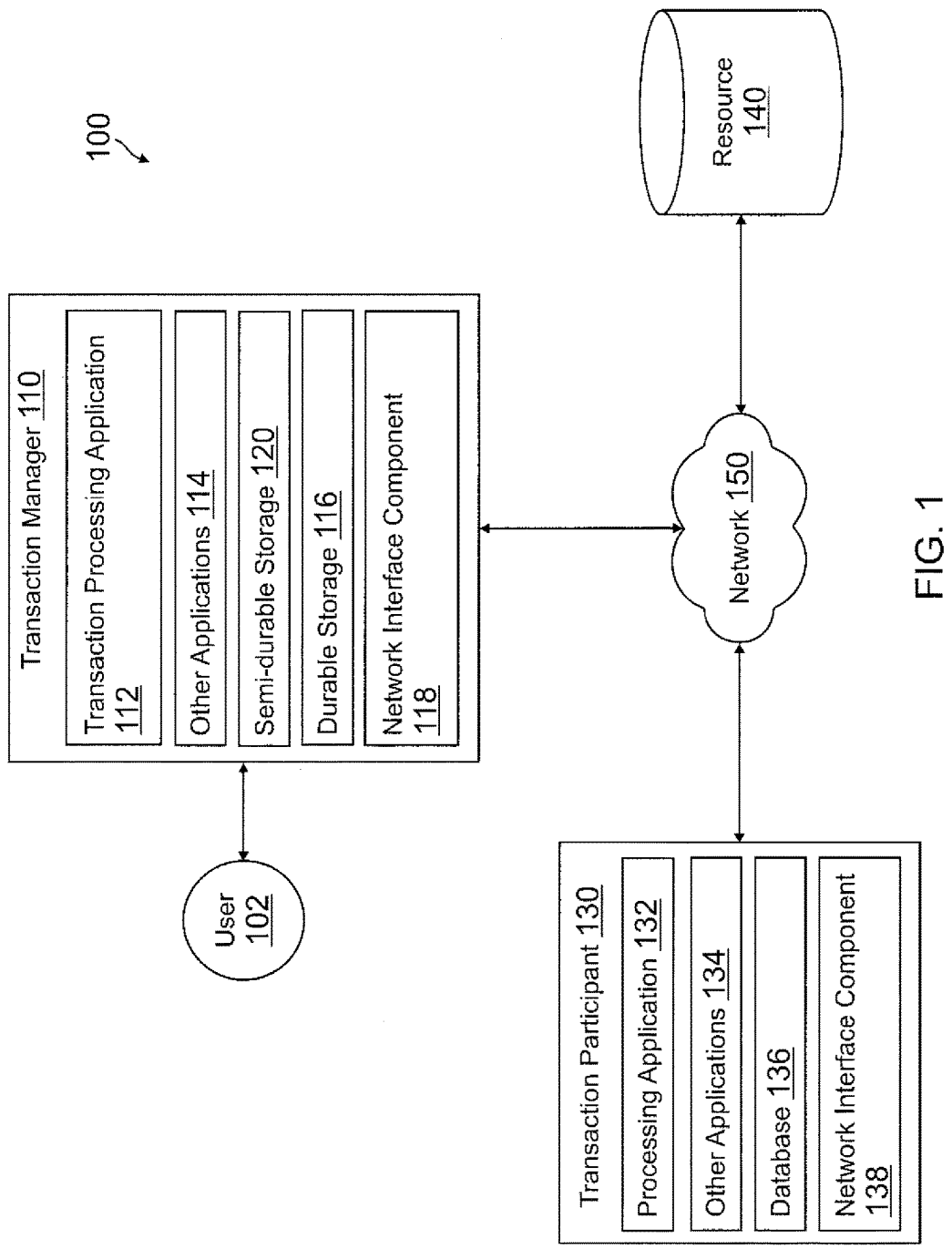
FIG. 1 is a simplified block diagram an exemplary system for semi-durable storage of a transaction log for a transaction processing system using a two-phase commit protocol, according to an embodiment.

FIG. 1 is a simplified block diagram an exemplary system for semi-durable storage of a transaction log for a transaction processing system using a two-phase commit protocol, according to an embodiment. Terms like "machine," "device," "computer," and "computing system" are used interchangeably and synonymously throughout this document. System 100 may include a server computing system or a client computing system.

FIG. 1 is a block diagram of a networked system 100 suitable for implementing the processes described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, an APPLE® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client 102, a transaction manager 110, a transaction participant 130, and a resource 140 in communication over a network 150. Client 102, transaction manager 110, transaction participant 130, and resource 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

In FIG. 1, client 102 may submit a distributed transaction for processing to transaction manager 110, such as a transaction having processes requiring the use of resource 140. Transaction manager 110 may establish one or more transaction participants 130 to prepare for execution the processes of the distributed transaction. Transaction participant 130 may utilize resource 140 to complete the processes. Transaction manager 110 may receive and/or determine a transaction log having information of transaction participant 130, actions executed by transaction participant 130 (e.g., execution of steps of the processes), and/or states of resource 140 for use in rollback, roll-forward, and/or committing the processes results to resource 140. Transaction manager 110 may further store the transaction log to a semi-durable storage that may survive a system failure. Client 102 may be implemented using any appropriate hardware and software configured for wired and/or wireless communication with transaction manager 110. For example, in one embodiment, client 102 may be implemented as a personal computer (PC), a smart phone, personal digital assistant (PDA), laptop computer, tablet computer and/or other types of computing devices capable of transmitting and/or receiving data. Although a client is shown, the client may be managed or controlled by any suitable processing device. Although only one client is shown, a plurality of clients may be utilized.

Transaction manager 110 may be implemented using any appropriate hardware and software configured for wired and/or wireless communication with transaction participant 130 and resource 140 over network 150. For example, in one embodiment, transaction manager 110 may be implemented as a personal computer (PC), a smart phone, personal digital assistant (PDA), laptop computer, tablet computer and/or other types of computing devices capable of transmitting and/or receiving data. Although a transaction manager is shown, the transaction manager may be managed or controlled by any suitable processing device.

Transaction manager 110 may utilize one or more applications to process a distributed transaction, where the applications may utilize a two-phase commit protocol (2PC) to process to the distributed transaction. In this regard, transaction manager 110 contains a transaction processing application 112, other applications 114, a semi-durable storage 120, a durable storage 116, and a network interface component 118. Transaction processing application 112 and other applications 114 may correspond to processes, procedures, and/or applications executable by a hardware processor, for example, a software program. In other embodiments, transaction manager 110 may include additional or different software as required.

Transaction processing application 112 may be implemented as an application configured to provide distributed transaction processing to client 102. Client 102 may transmit a distributed transaction to transaction manager 110 for processing. Transaction processing application 112 may receive and process the distributed transaction by determining the processes of the distributed transaction and establishing participating network nodes to execute the processes of the distributed transaction. In this regard, transaction processing application 112 may establish transaction participant 130, which may perform one or more processes of the distributed transaction on resource 140. A process may correspond to a database update/use that changes (e.g., adds, alters, or deletes) data stored on the database. As database transactions often require the use of multiple databases, multiple transaction participants 130 may be established, each operating on one or more resources 140.

Transaction processing application 112 may utilize a two-phase commit protocol (2PC) to determine whether each of the established transaction participants (e.g., transaction participant 130) is ready to execute and commit the respective process on operated-on resource of the transaction participants. 2PC requires a main transaction coordinator to poll the participating nodes to determine whether the processes can commit, or are in a state where the processes have executed correctly and may make the changes to the database (called a voting phase). If every participating node responds that their respective process can commit, then the main coordinator instructs the nodes to commit the process (called a commit phase). If any participating node responds that the node cannot commit, then the distributed transaction is rolled back so that no changes take place.

Transaction processing application 112 may establish a coordinator that may determine whether each of the transaction participants is ready to commit the process to the resource (e.g., commit the data transformation on the database updated by the process). The transaction participants may execute the process up to the point that the process is ready to commit. Once the transaction participant is ready to commit, the coordinator established on transaction manager 110 may poll each of the transaction participants to determine the commit status of the transaction participants and the transaction participant may communicate the status (e.g., a ready to commit status) to the coordinator established by transaction processing application 112. Thus, as each transaction participant determines that the transaction participant can prepare, transaction manager 110 receives the determination that the transaction participant can prepare. If any of the transaction participants fail to prepare the process to a ready to commit point (e.g., some failure makes commitment of the process impossible), the coordinator of transaction processing application 112 may inform all of the established transaction participants to roll back and prevent any process from executing and committing the changes to the resource.

Transaction processing application 112 may utilize a transaction log to rollback or commit processes executing on transaction participant 130. In order to maintain ACID semantics, transaction processing application 112 may retain a transaction log having the transaction participants (e.g., transaction participant 130), an initial state of each of the transaction participants and their corresponding resource (e.g., a rollback state), and/or processes taken by each of the transaction participants. For example, transaction processing application 112 may establish a transaction log enabling identification of transaction participant 130 and processes of a distributed transaction to be executed by transaction participant 130. Additionally, transaction processing application 112 may receive information from transaction participant 130, such as actions/processes taken by transaction participant 130 while preparing the received processes of the distributed transaction for execution (e.g., to a ready to commit state). If database or other changes are made to resource 140, transaction processing application 112 may receive an initial state of resource 140 prior to manipulation/processing and the actions taken on resource 140. Transaction processing application 112 may generate a transaction log having all of the aforementioned information. The transaction log may be utilized for rollback to an initial state in the event of system failure, failure of a participant, and/or failure of the coordinator. In other embodiments, the transaction log may be used by transaction processing application 112 to roll-forward transaction participant 130 and/or resource 140 in the event of a total failure and restoration of transaction participant 130 and/or resource 140 from a backup. Transaction processing application 112 may also use the transaction log to commit the executed processes to complete the distributed transaction.

Transaction processing application 112 may write the transaction log to semi-durable storage 120. Semi-durable storage 120 includes storage that can survive a system failure for at least a period of time enabling writing of the transaction log to durable storage or recovering the system. Semi-durable storage 120 may correspond to one or a plurality of storage mediums. Semi-durable storage 120 may be replicated on other machines/nodes than transaction manager 110 to provide additional availability. Semi-durable storage 120 may have a write speed faster than durable storage 116. Semi-durable storage 120 may receive and store the transaction log prior to durable storage 116. Semi-durable storage 120 may include non-volatile random-access memory (NVRAM), Magnetoresistive RAM (MRAM), Ferroelectric RAM (F-RAM), flash memory, etc. Semi-durable storage 120 acts as a cache prior to durable storage 116 that receives and stores the transaction log and may be written to and culled more quickly than durable storage 116. Thus, semi-durable storage 120 may be an in-memory or high throughput semi-volatile log, which can survive a system failure for at least a period of time.

Once semi-durable storage 120 stores the transaction log, transaction processing application 112 may execute a periodic thread to write the transaction log from semi-durable storage 120 to durable storage 116. Thus, the transaction log may be durably stored on durable storage 116. Prior to writing the transaction log to durable storage 116 using the periodic thread, the transaction log in semi-durable storage 120 may be culled by transaction processing application 112. In various embodiments, a write to the transaction log in semi-durable storage 120 (e.g., an action or process taken by transaction participant 130 that changes a value in resource 140) may be followed by another write that overwrites the previous write (e.g., changes the value again in resource 140) or a delete of the transaction log (e.g., a transaction successfully completes). Thus, transaction processing application 112 may remove other writes that are queued to be written from semi-durable storage 120 to durable storage 116 or delete transaction logs for completed distributed transactions. Therefore, the amount of data in the transaction log may be less when written from semi-durable storage 120 to durable storage 116.

In the event of a system failure or a failure of transaction manager 110 (e.g., a crash or power failure), the system may flush the transaction log and contents of semi-durable storage 120 to durable storage 116 by writing the transaction log to durable storage 116. Thus, semi-durable storage may be accessible and retainable for at least a limited time after a crash so that the transaction log can be written to durable storage 116. Semi-durable storage 120 may include capabilities to flush the transaction log to storage on durable storage 116 in the event of a system failure (e.g., write the contents of semi-durable storage 120 to durable storage 116 on system failure) or transaction manager 110 may write the transaction log to durable storage 116 from semi-durable storage 120 when transaction manager 110 recovers from failure.

Additionally, transaction participant 130 may provide a participant log having rollback states, executed actions/processes of a distributed transaction, and other information enabling rollback or commitment of processes of a distributed transaction, as will be explained in more detail herein. The participant log may be retained by semi-durable storage 120 and periodically written to durable storage 120 or similarly flushed to durable storage 120 on system failure.

Transaction manager 110 includes other applications 114 as may be desired in particular embodiments to provide features to transaction manager 110. For example, other applications 114 may include security applications for implementing security features, programmatic client applications for interfacing with appropriate application programming interfaces (APIs) over network 150, or other types of applications. Other applications 114 may contain software programs, executable by a processor, including a graphical user interface (GUI) configured to provide an interface to a client/user/system administrator.

Transaction manager 110 may further include durable storage 116 which may include, for example, 2PC protocol information, network node information including identifiers, corresponding resources, and/or processing information. Durable storage 116 may include a distributed transaction for processing by transaction manager 110. Durable storage 116 may include information on established transaction participants including a commit state of the corresponding established transaction participant. Durable storage 116 may include transaction logs written to durable storage 116 from semi-durable storage 120. Durable storage 116 may correspond to a disk drive or other non-volatile memory.

In various embodiments, transaction manager 110 includes at least one network interface component 118 adapted to communicate with transaction participant and resource 140 over network 150. In various embodiments, network interface component 118 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Transaction participant 130 may be implemented using any appropriate hardware and software configured for wired and/or wireless communication with transaction participant 130 and resource 140 over network 150. For example, in one embodiment, transaction participant 130 may be implemented as a personal computer (PC), a smart phone, personal digital assistant (PDA), laptop computer, tablet computer and/or other types of computing devices capable of transmitting and/or receiving data. Although a transaction participant is shown, the transaction participant may be managed or controlled by any suitable processing device. Although only one transaction participant is shown, a plurality of transaction participants may be utilized.

Transaction participant 130 may utilize one or more applications to process a received prepare request having at least one process of a distributed transaction using a two-phase commit protocol application (2PC). In this regard, transaction participant 130 contains a processing application 132, other applications 134, a database 136, and a network interface component 138. Processing application 132 and other applications 134 may correspond to processes, procedures, and/or applications executable by a hardware processor, for example, a software program. In other embodiments, transaction participant 130 may include additional or different software as required.

Processing application 132 may be configured to provide processing of received prepare requests from a main coordinator established by transaction manager 110. In this regard, processing application 132 may receive a prepare request from transaction manager 110. The prepare request may include at least one process to execute by transaction participant 130. Using a 2PC protocol, processing application 132 may execute the process up until transaction participant is ready to commit the changes to one or more resources (e.g., resource 140). Once transaction participant reaches this state, a "ready to commit" state, transaction participant may respond to a query by transaction manager 110 containing information that transaction participant 130 is ready to commit the process to the resource. However, if during execution of the process, processing application 132 is unable to reach resource 140, finds inconsistent states in a resource of execution of the process, or otherwise requires a rollback to an initial state, processing application 132 may respond to the main coordinator that transaction participant 130 is unable to commit to process of the distributed transaction. Thus, the main coordinator may issue a rollback command to transaction participant 130 and other transaction participants to revert any changes made by processing application 132 and revert transaction participant and/or resource 140 to an original state prior to processing the distributed transaction.

While executing the process up to a ready to commit state, processing application 132 may retain a participant transaction log having data corresponding to the coordinator, an initial state of resource 140, and processes taken by transaction participant 130. Transaction participant 130 may wait until the coordinator executing on transaction manager 110 notifies the transaction participant to commit before executing the process on the resource (e.g., permanently changing the resource to survive failures and meet a durability requirement). If the transaction participant fails, the coordinator fails, or another issue arises, the participant transaction log can be used to "rollback" or revert to the initial state. The participant transaction log may also be used to commit processes of the distributed transaction or roll-forward transaction participant 130 and/or resource 140 in the event of total system failure. The participant transaction log may be transmitted to transaction manager 110 for storage in semi-durable storage 120 and eventual write to durable storage 116 if required. However, in other embodiments, transaction participant 130 includes a local semi-durable storage and/or durable storage that may store the participant transaction log. The participant transaction log may be utilized to determine at least a part of the transaction log utilized by transaction manager 110.

In various embodiments, transaction participant 130 includes other applications 134 as may be desired in particular embodiments to provide features for transaction participant 130. For example, other applications 134 may include security applications for implementing security features, programmatic server applications for interfacing with appropriate application programming interfaces (APIs) over network 150, or other types of applications. Other applications 134 may contain software programs, such as a graphical user interface (GUI), executable by a processor that is configured to provide an interface to the user.

Transaction participant 130 includes database 136, which may be configured to store 2PC protocol information, network node information including identifiers, corresponding resources, and/or processing information. Database 136 may include a distributed transaction processes designated for processing by transaction participant 130. Database 136 may include participant transaction log information for coordinator, initial state of a resource used by transaction participant 130, completed processes by transaction participant 130 or other information necessary for rollback and roll-forward states. In various embodiments, database 136 may correspond to a semi-durable and/or durable storage similar to semi-durable storage 120 and/or durable storage 116, respectively.

In various embodiments, transaction participant 130 includes at least one network interface component 138 adapted to communicate with network 150 including transaction manager 110 and/or resource 140. In various embodiments, network interface component 138 may comprise a DSL (e.g., Digital Subscriber Line) modem, a PSTN (Public Switched. Telephone Network) modem, an Ethernet device, a broadband device, a satellite device and/or various other types of wired and/or wireless network communication devices including microwave, radio frequency (RF), and infrared (IR) communication devices.

Resource 140 may correspond to a resource accessible and utilized by transaction manager 110 and/or participating node 120 during processing of a distributed transaction. Resource 140 may correspond to a database having data organized and/or stored in data structures that may be searched, altered, and stored. It is understood that resource 140 is exemplary and various embodiments may include a different number of resources as desired. Although resource 140 is shown separate and accessible over network 150 to participating node 120, in various embodiments, resource 140 may be local or contained within participating node 120.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, for example the various components of system 100 of FIG. 1.

Figure 2:
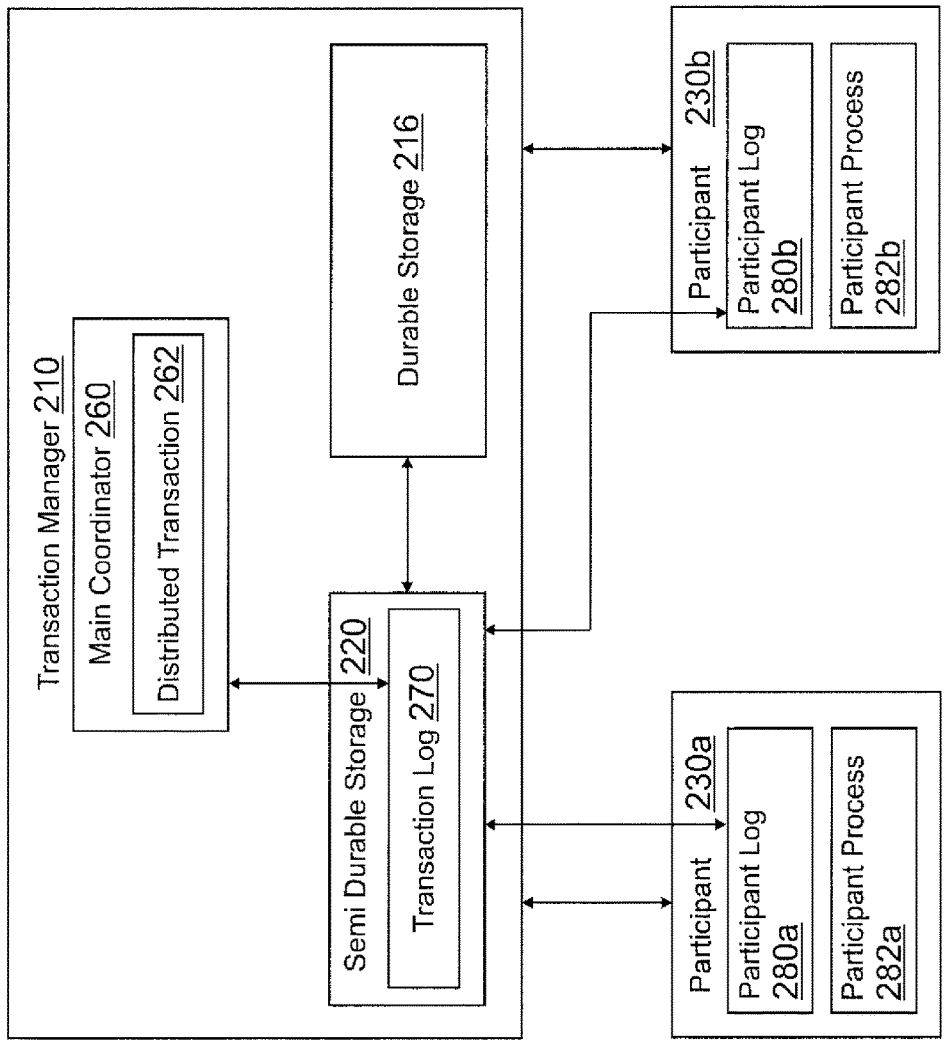
FIG. 2 is an exemplary environment illustrating a transaction manager having semi-durable storage for a transaction log generated during processing a distributed transaction using a two-phase commit protocol, according to an embodiment.

FIG. 2 is an exemplary environment illustrating a transaction manager having semi-durable storage for a transaction log generated during processing a distributed transaction using a two-phase commit protocol, according to an embodiment. FIG. 2 includes a transaction manager 210 corresponding generally to transaction manager 210 of FIG. 1 and participants 220*a* and 220*b* corresponding generally to transaction participant 120 of FIG. 1.

Transaction manager 210 includes a main coordinator 260 having a distributed transaction 262. Transaction manager 210 may establish main coordinator 260 for processing distributed transaction 262. Thus, main coordinator 260 may determine a number of transaction participants to process the processes of distributed transaction 262 on their respective resources. Thus, main coordinator 260 may establish participant 230*a* and 230*b* for processing their participant process 282*a* and 282*b*, respectively, which make up distributed transaction 262. Participants 230*a* and 230*b* may respond to the prepare call from main coordinator 260 by executing processes transmitted to participants 230*a* and 230*b* until the processes can be committed or participants 230*a* and 230*b* encounter an issue requiring rollback of processing distributed transaction 262.

When establishing participants 230*a* and 230*b* by transmitting prepare calls to participants 230*a* and 230*b*, main coordinator 260 may generate information identifying participants 230*a* and 230*b* including the processes of distributed transaction 262 sent to each of participants 230*a* and 230*b*. Additionally, main coordinator 260 main receive participant logs 280*a* and 280*b* from participants 230*a* and 230*b*, respectively. Participant logs 280*a* and 280*b* may include information corresponding to commit states of participants 230*a* and 230*b* (e.g., ready to commit or failure to commit), actions taken by participants 230*a* and 230*h*, and/or resource initial states and changes for resources corresponding to participants 230*a* and 230*b*.

Main coordinator 260 may utilize the information of participants 230*a* and 230*b* and participant logs 282*a* and 282*b* to generate and update a transaction log 270. Main coordinator 260 may store transaction log 270 to a semi-durable storage 220, as previously discussed. Writing to semi-durable storage 220 may be faster than writing to a durable storage 216. Thus, main coordinator 260 may more quickly process distributed transactions by storing transaction log 270 to semi-durable storage 220. Main coordinator 260 may further use a periodic thread to write transaction log 270 to durable storage 216. Durable storage 216 may also receive transaction log 270 in the event of a system failure, such as a crash of transaction manager 210 and/or main coordinator 260. In such an event, semi-durable storage 220 may include capabilities to flush transaction log 270 to durable storage 216 for storage.

In various embodiments, participants 230*a* and 230*b* may store participant logs 280*a* and 280*b* having commit states, actions taken, and resource states (e.g., initial and changes) locally as well. Local storage may include storage to a local semi-durable storage similar to semi-durable storage 220. Moreover, and similar to as described above, participants 230*a* and 230*b* may include durable storage for writing participant logs 280*a* and 280*b* from the semi-durable storage to a durable storage.

Figure 3:
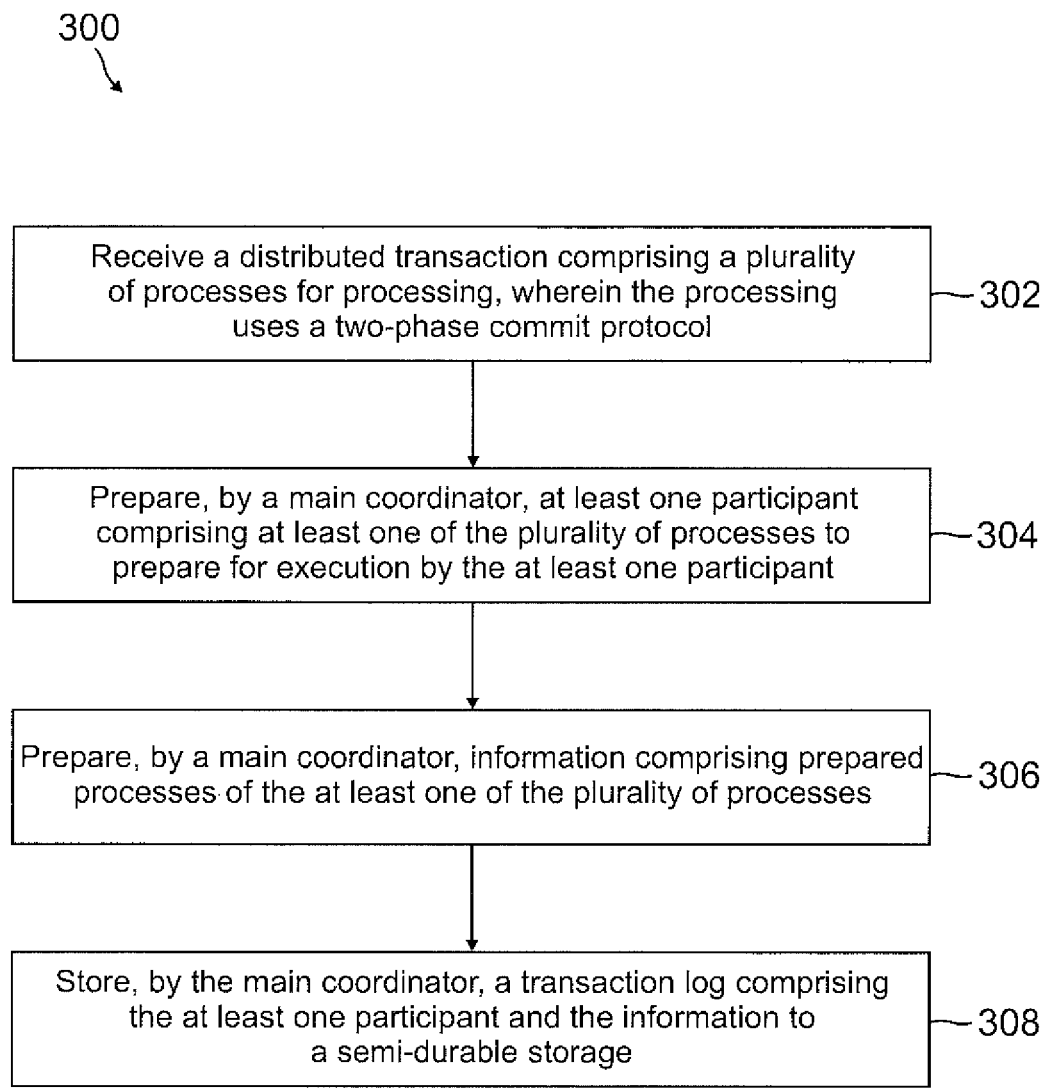
FIG. 3 is an exemplary flowchart illustrating a method for semi-durable storage of a transaction log in two-phase commit transaction processing, according to an embodiment.

FIG. 3 is an exemplary flowchart illustrating a method for semi-durable storage of a transaction log in two-phase commit transaction processing, according to an embodiment. Note that one or more steps, processes, and methods described herein may be omitted, performed in a different sequence, or combined as desired or appropriate.

At step 302, a distributed transaction comprising a plurality of processes for processing is received, wherein the processing uses a two-phase commit protocol. A main coordinator prepares at least one participant comprising at least one of the plurality of processes for execution by the at least one participant, at step 304. The at least one participant may generate a participant log comprising the prepared processes and at least one state of a resource used by the at least one participant.

Thus, at step 306, the main coordinator receives information comprising prepared processes of the at least one of the plurality of processes. The information may be received from the at least one participant and, in various embodiments, comprise the participant log. At step 308, the main coordinator stores a transaction log comprising the at least one participant and the information to a semi-durable storage. In various embodiments, the participant log is also stored/written to the semi-durable storage.

The semi-durable storage may comprise a crash-proof storage accessible for at least a limited period of time after recovering from a system failure. Thus, the semi-durable storage may comprise non-volatile RAM. The main coordinator may determine the transaction log. Additionally, a durable storage may receive the transaction log from the semi-durable storage and store the transaction log, where the semi-durable storage first stores the transaction log. For example, a periodic thread may write the transaction log from the semi-durable storage to the durable storage. In other embodiments, the transaction log is written from the semi-durable storage to a durable storage if there is a system failure. The durable storage may comprise a disk drive.

The transaction log in the semi-durable storage may be culled to remove log entries of the information after a resource corresponding to the at least one participant is updated. Thus, the transaction log written to the durable storage may include a culled transaction log smaller than the transaction log written to the semi-durable storage.

Figure 4:
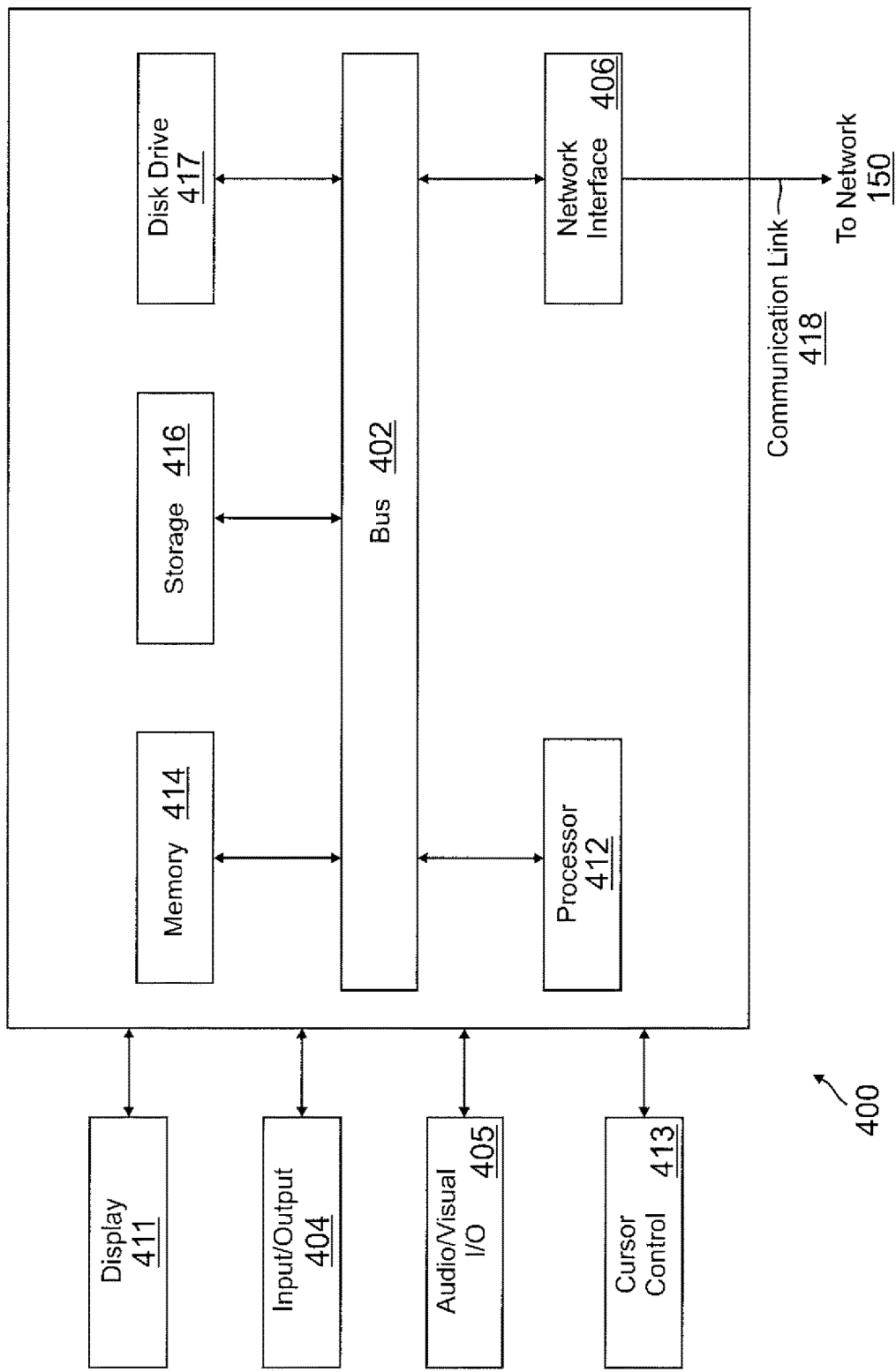
FIG. 4 is a simplified block diagram of a computer system suitable for implementing one or more embodiments of the present disclosure.

FIG. 4 is a block diagram of a computer system 400 suitable for implementing one or more embodiments of the present disclosure. In various embodiments, the endpoint may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another endpoint, a merchant server, or a service provider server via network 150. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 500 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for distributed transaction processing, the system comprising:
one or more hardware processors configured to execute instructions to:
receive a distributed transaction comprising a plurality of processes for processing, wherein the processing uses a two-phase commit protocol;
prepare, by a main coordinator, at least one participant comprising at least one of the plurality of processes to prepare for execution by the at least one participant on at least one resource;
receive, by the main coordinator, information comprising prepared processes of the at least one of the plurality of processes prior to execution of the prepared processes on the at least one resource by the at least one participant;
receive an initial state for each of the at least one resource prior to the prepared processes for the at least one resource;
generate a transaction log for the distributed transaction for the at least one participant using the information, wherein the transaction log comprises the prepared processes and the initial state for the each of the at least one resource;
store the transaction log to a semi-durable storage of the main coordinator, wherein the semi-durable storage is remote and separate from the at least one participant, and wherein a first write speed of the semi-durable storage is faster than a second write speed of a durable storage of the main coordinator;
replicate the transaction log on at least one additional semi-durable storage for each of the at least one participant, wherein the at least one additional semi-durable storage is further configured to retain in the transaction log for a time after a system failure;
determine, during processing the distributed transaction, the executed processes in the update information;
remove the executed processes from the transaction log in the semi-durable storage and the transaction log replicated on the at least one additional semi-durable storage to generate a culled transaction log in the semi-durable storage of the main coordinator and a participant log in the each of the at least one additional semi-durable storage of the each of the at least one participant;

in response to determining the system failure, execute a flush process to store the culled transaction log to the durable storage of the main coordinator, wherein the each of the at least one participant further execute the flush process to store the culled transaction log on at least one additional durable storage of the at least one participant;

retrieve the culled transaction log from the durable storage, wherein the culled transaction log comprises a commit state for the at least one participant;

determine that the at least one participant has recovered after the system failure;

request a status of the at least one participant based on the participant log stored to the at least one additional durable storage of the at least one participant; and determine whether to rollback or commit the prepared processes for the each of the at least one resource based on the culled transaction log and the participant log for the each of the at least one participant.

2. The system of claim 1, wherein the semi-durable storage comprises a crash-proof storage accessible for at least a limited period of time after recovering from the system failure.

3. The system of claim 2, wherein the semi-durable storage comprises non-volatile RAM.

4. The system of claim 1, wherein prior to generating the transaction log, the one or more hardware processors are further configured to execute the instructions to:
determine, by the main coordinator, the transaction log using the information and the initial state.

5. The system of claim 1 wherein one or more hardware processors are further configured to execute the instructions to:
write the culled transaction log to the durable storage and the participant log to the at least one additional durable storage using a periodic write thread process during processing of the distributed transaction, wherein the write of the culled transaction log and the participant log overwrites a previously written transaction log stored in the durable storage and a previously written transaction log associated stored in the at least one durable storage using the periodic write thread process.

6. The system of claim 5, wherein writing the culled transaction log to the durable storage and the participant log to the at least one additional durable storage further comprises removing queued writes associated with the culled transaction log and the participant log.

7. The system of claim 5, wherein the durable storage comprises a disk drive.

8. The system of claim 1, wherein the flush process comprises writing the culled transaction log to the durable storage and the participant log to the at least one additional durable storage in response to the system failure.

9. The system of claim 1, wherein the one or more hardware processors are further configured to:
generate, by the at least one participant, the participant log comprising the prepared processes of the at least one participant.

10. A method for distributed transaction processing, the method comprising:
receiving, by a main coordinator, a distributed transaction comprising a plurality of processes for processing, wherein the processing uses a two-phase commit protocol;

preparing, by the main coordinator, at least one participant comprising at least one of the plurality of processes to prepare for execution by the at least one participant on at least one resource;

receiving, by the main coordinator, information comprising prepared processes of the at least one of the plurality of processes prior to execution of the prepared processes on the at least one resource by the at least one participant;

receiving an initial state for each of the at least one resource prior to the prepared processes for the at least one resource;

generating a transaction log for the distributed transaction for the at least one participant using the information, wherein the transaction log comprises the prepared processes and the initial state for the each of the at least one resource;

storing, using one or more hardware processors of the main coordinator, the transaction log to a semi-durable storage of the main coordinator, wherein the semi-durable storage is remote and separate from the at least one participant, and wherein a first write speed of the semi-durable storage is faster than a second write speed of a durable storage of the main coordinator;

replicating the transaction log on at least one additional semi-durable storage for each of the at least one participant, wherein the at least one additional semi-durable storage is further configured to retain in the transaction log for a time after a system failure;

determining, during processing the distributed transaction, the executed processes in the update information;

removing the executed processes from the transaction log in the semi-durable storage and the transaction log replicated on the at least one additional semi-durable storage to generate a culled transaction log in the semi-durable storage of the main coordinator and a participant log in the each of the at least one additional semi-durable storage of the each of the at least one participant;

in response to determining the system failure, executing a flush process to store the culled transaction log to the durable storage of the main coordinator, wherein the each of the at least one participant further execute the flush process to store the culled transaction log on at least one additional durable storage of the at least one participant;

retrieving the culled transaction log from the durable storage, wherein the culled transaction log comprises a commit state for the at least one participant;

determining that the at least one participant has recovered after the system failure;

requesting a status of the at least one participant based on the participant log stored to the at least one additional durable storage of the at least one participant; and determining whether to rollback or commit the prepared processes for the each of the at least one resource based on the culled transaction log and the participant of the at least one participant.

11. The method of claim 10, wherein the semi-durable storage comprises a crash-proof storage accessible for at least a limited period of time after recovering from the system failure.

12. The method of claim 11, wherein the semi-durable storage comprises non-volatile RAM.

13. The method of claim 10, wherein prior to generating the transaction log, the method further comprises:
determining, by the main coordinator, the transaction log using the information and the initial state.

14. The method of claim 10, further comprising:
writing the culled transaction log to the durable storage and the participant log to the at least one additional durable storage using a periodic write thread process during processing of the distributed transaction, wherein the writing the culled transaction log and the participant log overwrites a previously written transaction log stored in the durable storage and a previously written transaction log associated stored in the at least one durable storage using the periodic write thread process.

15. The method of claim 14, wherein the periodic write thread process writes the culled transaction log from the semi-durable storage to the durable storage and the participant log to the at least one additional durable storage and removes queued writes from a write queue of the culled transaction log and the participant log.

16. The method of claim 14, wherein the flush process comprises writing the culled transaction log from the semi-durable storage to the durable storage and the participant log to the at least one additional durable storage in response to detecting the system failure.

17. A non-transitory computer readable medium comprising a plurality of machine-readable instructions which when executed by one or more processors of a server are adapted to cause the server to perform a method comprising:
receiving, by a main coordinator, a distributed transaction comprising a plurality of processes for processing, wherein the processing uses a two-phase commit protocol;
preparing, by main coordinator, at least one participant comprising at least one of the plurality of processes to prepare for execution by the at least one participant on at least one resource;
receiving, by the main coordinator, information comprising prepared processes of the at least one of the plurality of processes prior to execution of the prepared processes on the at least one resource by the at least one participant
receiving an initial state for each of the at least one resource prior to the prepared processes for the at least one resource;
generating a transaction log for the distributed transaction for the at least one participant using the information, wherein the transaction log comprises the prepared processes and the initial state for the each of the at least one resource;
storing, by the main coordinator, the transaction log to a semi-durable storage of the main coordinator, wherein the semi-durable storage is remote and separate from the at least one participant, and wherein a first write speed of the semi-durable storage is faster than a second write speed of a durable storage of the main coordinator;
replicating the transaction log on at least one additional semi-durable storage for each of the at least one participant, wherein the at least one additional semi-durable storage is further configured to retain in the transaction log for a time after a system failure;
determining, during processing the distributed transaction, the executed processes in the update information;
removing the executed processes from the transaction log in the semi-durable storage and the transaction log replicated on the at least one additional semi-durable storage to generate a culled transaction log in the semi-durable storage of the main coordinator and a participant log in the each of the at least one additional semi-durable storage of the each of the at least one participant;
in response to determining the system failure, executing a flush process to store the culled transaction log to the durable storage of the main coordinator, wherein the each of the at least one participant further execute the flush process to store the culled transaction log on at least one additional durable storage of the at least one participant;
retrieving the culled transaction log from the durable storage, wherein the culled transaction log comprises a commit state for the at least one participant;
determining that the at least one participant has recovered after the system failure;
requesting a status of the at least one participant based on the participant log stored to the at least one additional durable storage of the at least one participant; and
determining whether to rollback or commit the prepared processes for the each of the at least one resource based on the culled transaction log and the participant log for the each of the at least one participant.

18. The non-transitory computer readable medium of claim 17, wherein the method further comprises:
writing the transaction log to the durable storage using a periodic write thread process during processing of the distributed transaction, wherein the writing the transaction log overwrites a previously written transaction log associated with the distributed transaction and stored in the durable storage using the periodic write thread process.

* * * * *